(12) United States Patent
Hamada et al.

(10) Patent No.: US 9,720,866 B2
(45) Date of Patent: Aug. 1, 2017

(54) INTERFACE CIRCUIT EXECUTING PROTOCOL CONTROL IN COMPLIANCE WITH FIRST AND SECOND INTERFACE STANDARDS

(71) Applicant: Kabushiki Kaisha Toshiba, Minato-ku (JP)

(72) Inventors: Ken Hamada, Kawasaki (JP); Toshio Fujisawa, Yokohama (JP); Nobuhiro Kondo, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 241 days.

(21) Appl. No.: 14/657,281

(22) Filed: Mar. 13, 2015

(65) Prior Publication Data

US 2016/0077994 A1    Mar. 17, 2016

Related U.S. Application Data

(60) Provisional application No. 62/049,173, filed on Sep. 11, 2014.

(51) Int. Cl.
*G06F 13/40* (2006.01)
*G06F 13/42* (2006.01)

(52) U.S. Cl.
CPC ...... *G06F 13/4022* (2013.01); *G06F 13/4282* (2013.01)

(58) Field of Classification Search
CPC .... G06F 13/387; G06F 13/4022; G06F 13/42; G06F 13/4282
See application file for complete search history.

(56) References Cited

U.S. PATENT DOCUMENTS

| | | | |
|---|---|---|---|
| 8,301,822 B2 | 10/2012 | Pinto et al. | |
| 8,429,391 B2 | 4/2013 | Galbo et al. | |
| 2008/0181249 A1* | 7/2008 | Karaoguz | H04L 69/18 370/419 |
| 2012/0265919 A1 | 10/2012 | Jono et al. | |
| 2013/0322417 A1* | 12/2013 | Kao | H04W 88/06 370/338 |
| 2014/0269471 A1* | 9/2014 | Wagh | H04W 52/0203 370/311 |

FOREIGN PATENT DOCUMENTS

| | | | | |
|---|---|---|---|---|
| GB | WO 2004056045 A1 * | 7/2004 | ......... | H04L 12/2803 |
| JP | 2012-226457 | 11/2012 | | |
| JP | 2013-505507 | 2/2013 | | |
| JP | 2013-525886 | 6/2013 | | |

* cited by examiner

*Primary Examiner* — Glenn A Auve
(74) *Attorney, Agent, or Firm* — Oblin, McClelland, Maier & Neustadt, L.L.P.

(57) ABSTRACT

According to one embodiment, a first module is responsible for protocol control in compliance with a first interface standard. A second module is provided separately from the first module and is responsible for protocol control in compliance with a second interface standard. A third module is responsible for a physical layer shared between the first interface standard and the second interface standard.

17 Claims, 5 Drawing Sheets

INTERFACE CIRCUIT EXECUTING PROTOCOL CONTROL IN COMPLIANCE WITH FIRST AND SECOND INTERFACE STANDARDS

CROSS-REFERENCE TO RELATED APPLICATIONS

This application is based upon and claims the benefit of priority from U.S. Provisional Application No. 62/049,173, filed on Sep. 11, 2014; the entire contents of which are incorporated herein by reference.

FIELD

Embodiments described herein relate generally to an interface circuit.

BACKGROUND

There are various standards for interface circuits depending on high-speed performance, portability, and the like of a device. This causes the device to be equipped with individual interface circuits in conformity with the standards, which leads to increase in parts count.

DETAILED DESCRIPTION

In general, according to one embodiment, an interface circuit includes a first module, a second module, and a third module. The first module is responsible for protocol control in compliance with a first interface standard. The second module is provided separately from the first interface module and is responsible for protocol control in compliance with a second interface standard. The third module is responsible for a physical layer shared between the first interface standard and the second interface standard.

Exemplary embodiments of an interface circuit will be explained below in detail with reference to the accompanying drawings. The present invention is not limited to the following embodiments.

First Embodiment

Figure 1:
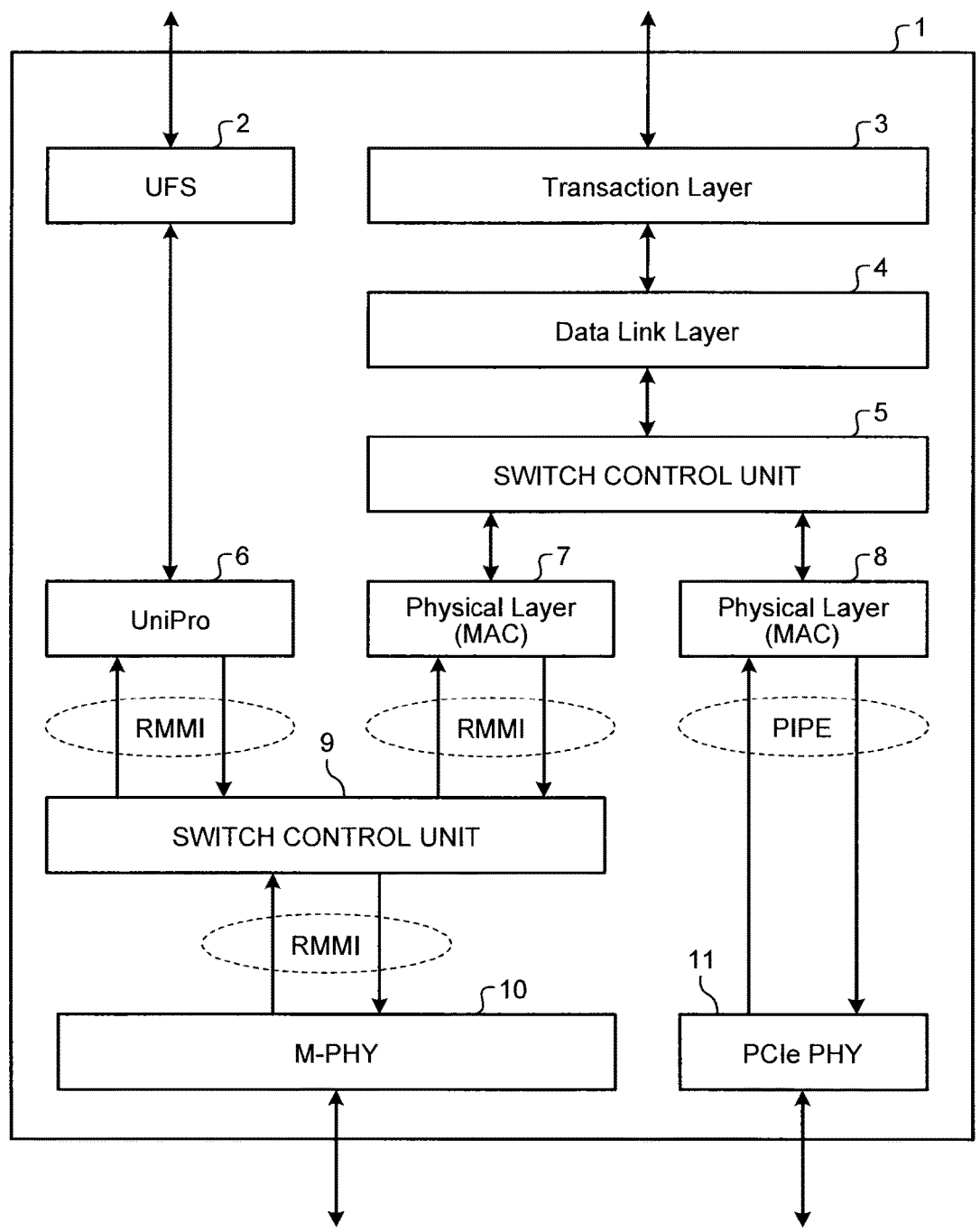
FIG. 1 is a schematic block diagram illustrating a configuration of an interface circuit according to a first embodiment.

FIG. 1 is a schematic block diagram illustrating a configuration of an interface circuit according to a first embodiment.

Referring to FIG. 1, an interface circuit 1 includes a UFS (Universal Flash Storage) higher-level module 2, a transaction module 3, a data link module 4, switch control units 5 and 9, a UniPro (Unified Protocol) module 6, MAC (Media Access Layer) modules 7 and 8, and PHY (Physical Layer) modules 10 and 11. The UFS higher-level module 2, the UniPro module 6, and the PHY module 10 can conform to UFS standard. The transaction module 3, the data link module 4, the MAC module 7, and the PHY module 10 can conform to M-PCIe (Mobile-Peripheral Component Interconnect Express) standard. The transaction module 3, the data link module 4, the MAC module 8, and the PHY module 11 can conform to PCIe (Peripheral Component Interconnect Express) standard. The PHY module 10 here is shared between the UFS standard and the M-PCIe standard. The transaction module 3 and the data link module 4 are shared between the M-PCIe standard and the PCIe standard. The switch control unit 5 can switch the destination for connection of the data link module 4 between the MAC module 7 and the MAC module 8. The switch control unit 9 can switch the destination for connection of the PHY module 10 between the UniPro module 6 and the MAC module 7. The UFS standard defines specifications for high-speed serial data communications applied to digital cameras, mobile phones, home electronic devices, and the like. The PCIe standard defines specifications for high-speed serial data communications applied to personal computers and the like. The M-PCIe standard defines specifications for high-speed serial data communications for graphic extension applied to notebook computers and the like based on the PCIe standard.

The UFS higher-level module 2 and the UniPro module 6 can be responsible for protocol control in conformity with the UFS standard. For example, the UFS higher-level module 2 can be responsible for UPIU transmission/reception. Under the UFS standard, data, commands, queries, and the like are transferred in packets. Write command is equivalent to a command transmission packet (command UPIU). The command transfer packet has a header, a command description portion in a packet body section, and a simplified SCSI (small computer system interface) command stored in the command description portion. The SCSI command includes a write command, an address, and a write data size. The UniPro module 6 can conform to a communication protocol for interconnection of devices. For example, under the UniPro, the UniPro module 6 can exchange data between clock domains, select a device as a destination for connection, establish connection, and the like.

The PHY module 10 can be responsible for a physical layer shared between the UFS standard and the M-PCIe standard. The PHY module 10 here can conform to a MIPI (Mobile Industry Processor Interface) M-PHY. The MIPI defines interface standards for cameras and displays in mobile devices. The MIPI M-PHY is an interface supporting both its own clock (source-synchronous) and an embedded clock. For example, the MIPI M-PHY can realize 8-bit/10-bit conversion, control code insertion/removal, serial-parallel conversion, differential signal conversion, and the like.

The transaction module 3 and the data link module 4 can be responsible for protocol control shared between the PCIe standard and the M-PCIe standard.

The transaction module 3 can be responsible for a transaction layer. The transaction layer basically can be in charge of generation and decoding of a transaction layer packet (TLP). For example, the transaction layer generates a TLP according to a request from a CPU. In addition, upon receipt of a request TLP, the transaction layer decrypts it and passes the request to the CPU. Further, upon receipt of a completion TLP, the transaction layer retrieves a payload and status from it and passes them to the CPU. The transaction layer optionally checks data consistency end to end.

The data link module 4 can be responsible for a data link layer. The data link layer basically can be in charge of management of a PCIe link, and detection and correction of an error. For example, the data link layer can perform data exchange, error detection and re-transmission, free control packet communication, initialization, power management, and the like.

The PHY module 11 can be responsible for a physical layer in compliance with the PCIe standard. The PHY module 11 here can conform to PCIe PHY. For example, the PCIe PHY can realize 8-bit/10-bit conversion, elastic buffer/receiver detection, serial-parallel conversion, analog buffer, and the like.

The MAC module 7 can realize access to the PHY module 10. The MAC module 8 can realize access to the PHY module 11. For example, the MAC modules 7 and 8 can realize byte stripping, link training state machine, scramble/descramble, inter-lane de-skew, and the like.

In addition, the UniPro module 6, the MAC module 7, and the PHY module 10 can conform to RMMI (Reference M-PHY Module Interface). The MAC module 8 and the PHY module 11 can conform to PIPE (Physical Interface for PCI Express).

In addition, a first pin that is intrinsic to UFS standard, a second pin that is intrinsic to M-PCIe standard, and a third pin that is intrinsic to PCIe standard may be provided for the interface circuit 1.

Figure 2:
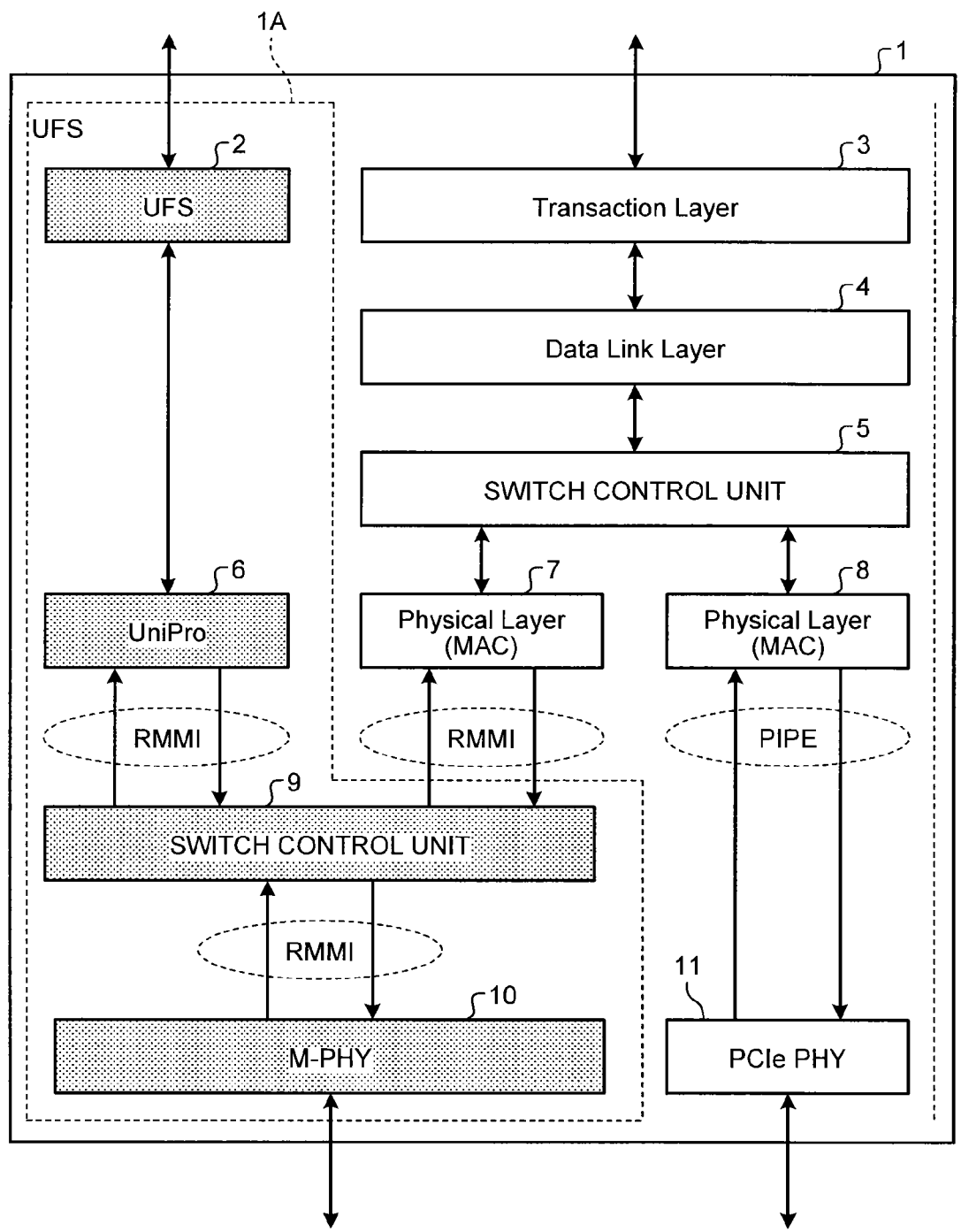
FIG. 2 is a block diagram illustrating a configuration of the interface circuit illustrated in FIG. 1 in conformity with UFS standard.

FIG. 2 is a block diagram illustrating a configuration of the interface circuit illustrated in FIG. 1 in conformity with the UFS standard.

Referring to FIG. 2, when the interface circuit 1 is to conform to the UFS standard, the PHY module 10 is connected to the UniPro module 6 via the switch control unit 9. Accordingly, the UFS higher-level module 2, the UniPro module 6, and the PHY module 10 constitute a UFS module 1A. As a result, the interface circuit 1 can transmit and receive data in conformity with the UFS standards.

Figure 3:
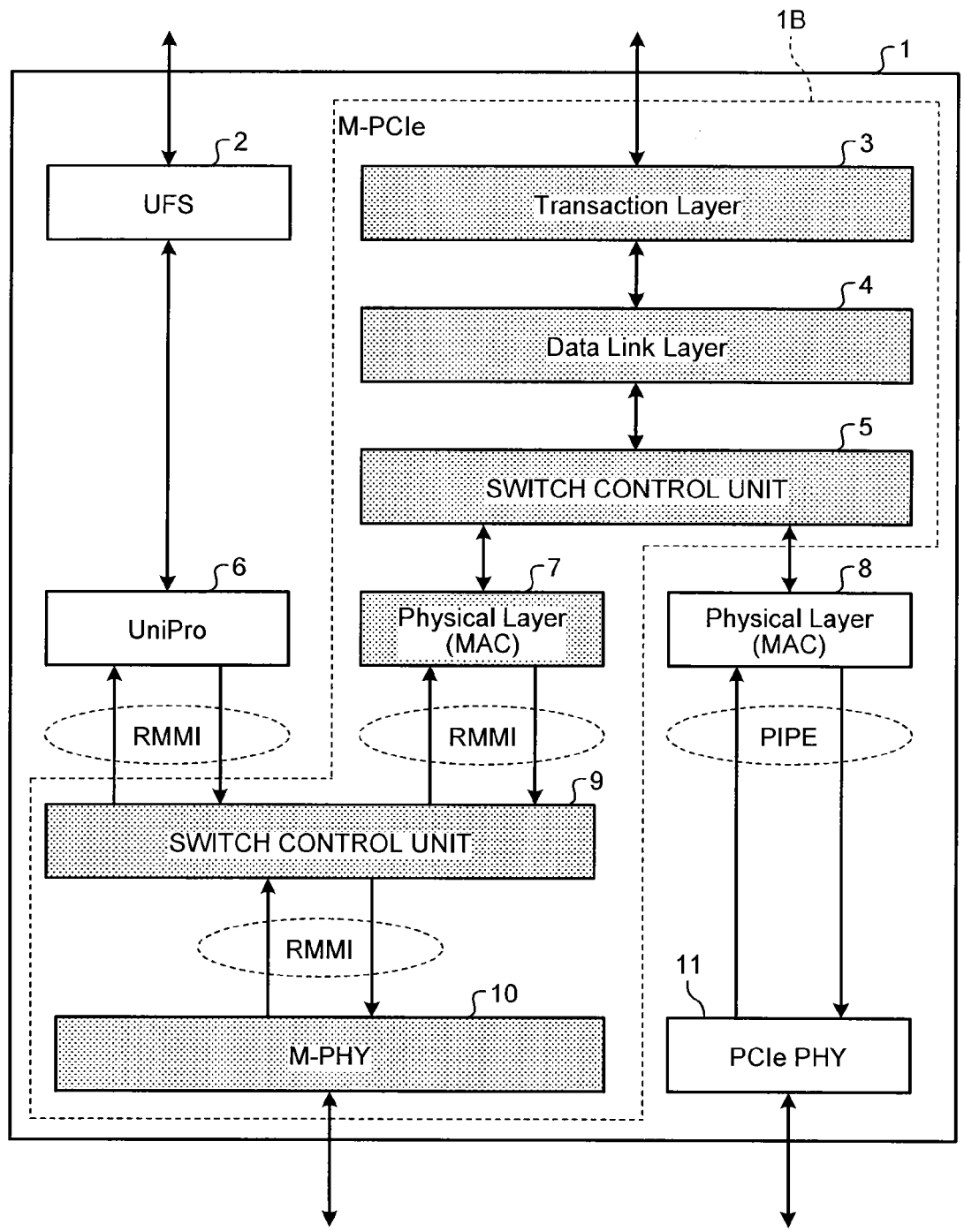
FIG. 3 is a block diagram illustrating a configuration of the interface circuit illustrated in FIG. 1 in conformity with M-PCIe standard.

FIG. 3 is a block diagram illustrating a configuration of the interface circuit illustrated in FIG. 1 in conformity with the M-PCIe standard.

Referring to FIG. 3, when the interface circuit 1 is to conform to the M-PCIe standard, the PHY module 10 is connected to the MAC module 7 via the switch control unit 9. In addition, the MAC module 7 is connected to the data link module 4 via the switch control unit 5. Accordingly, the transaction module 3, the data link module 4, the MAC module 7, and the PHY module 10 constitute an M-PCIe module 1B. As a result, the interface circuit 1 can transmit and receive data in conformity with the M-PCIe standard.

Figure 4:
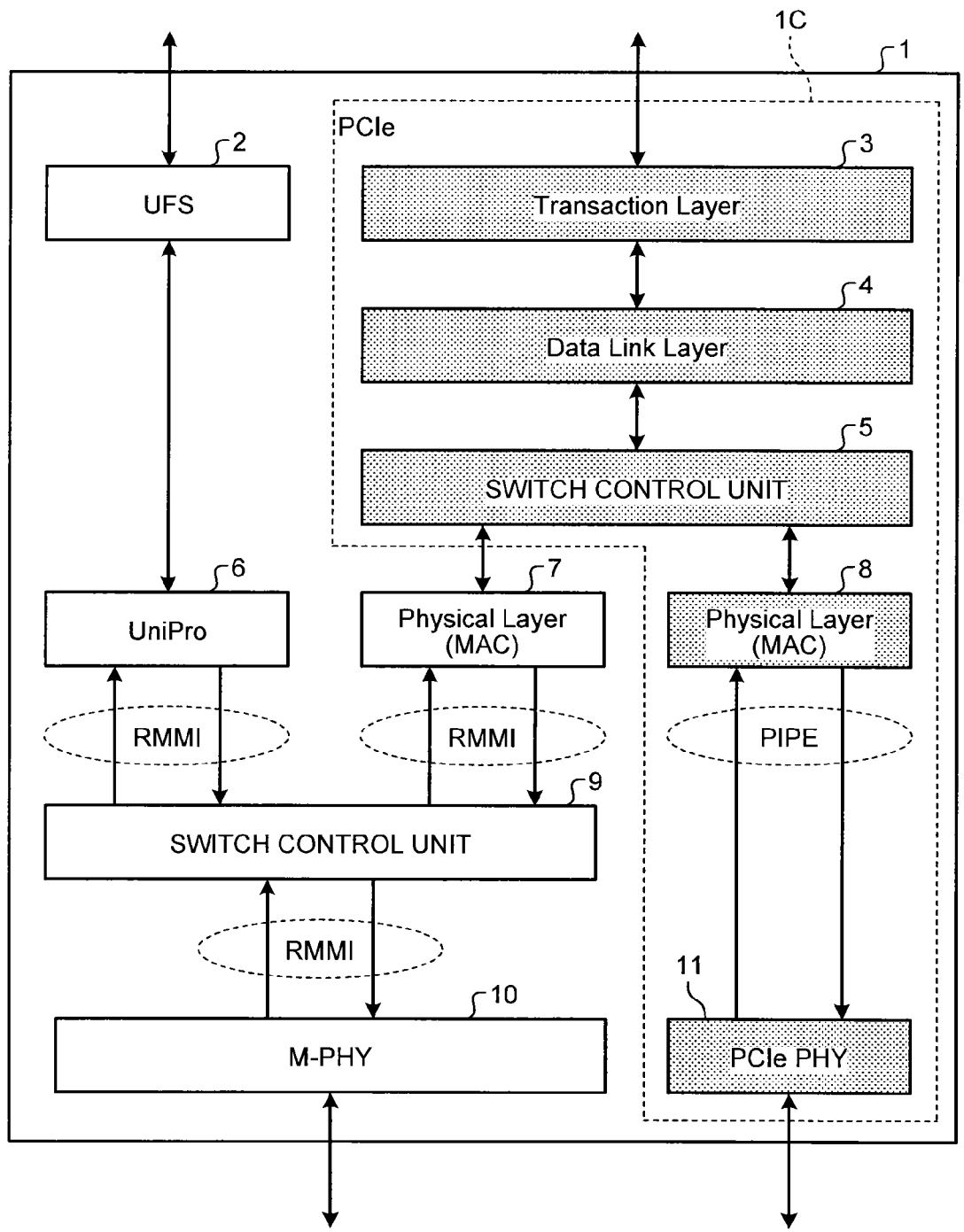
FIG. 4 is a block diagram illustrating a configuration of the interface circuit illustrated in FIG. 1 in conformity with PCIe standard.

FIG. 4 is a block diagram illustrating a configuration of the interface circuit illustrated in FIG. 1 in conformity with the PCIe standard.

Referring to FIG. 4, when the interface circuit 1 is to conform to the PCIe standard, the MAC module 8 is connected to the data link module 4 via the switch control unit 5. Accordingly, the transaction module 3, the data link module 4, the MAC module 8, and the PHY module 11 constitute a PCIe module 1C. As a result, the interface circuit 1 can transmit and receive data in conformity with the PCIe standard.

Sharing the PHY module 10 between the UFS standard and the M-PCIe standard eliminates the need to provide the PHY module 10 for each of the UFS standard and the M-PCIe standard. In addition, sharing the transaction module 3 and the data link module 4 between the M-PCIe standard and the PCIe standard eliminates the need to provide the transaction module 3 and the data link module 4 for each of the M-PCIe standard and the PCIe standard. This makes it possible to allow the interface circuit 1 to conform to the UFS standard, the PCIe standard, and the M-PCIe standard, while suppressing increase in parts count.

In the foregoing embodiment, the interface circuit 1 conforms to the UFS standard, the PCIe standard, and the M-PCIe standard as an example. Alternatively, the present invention may be applied to an interface circuit in conformity with the UFS standard and the PCIe standard, or an interface circuit in conformity with the PCIe standard and the M-PCIe standard.

Second Embodiment

Figure 5:
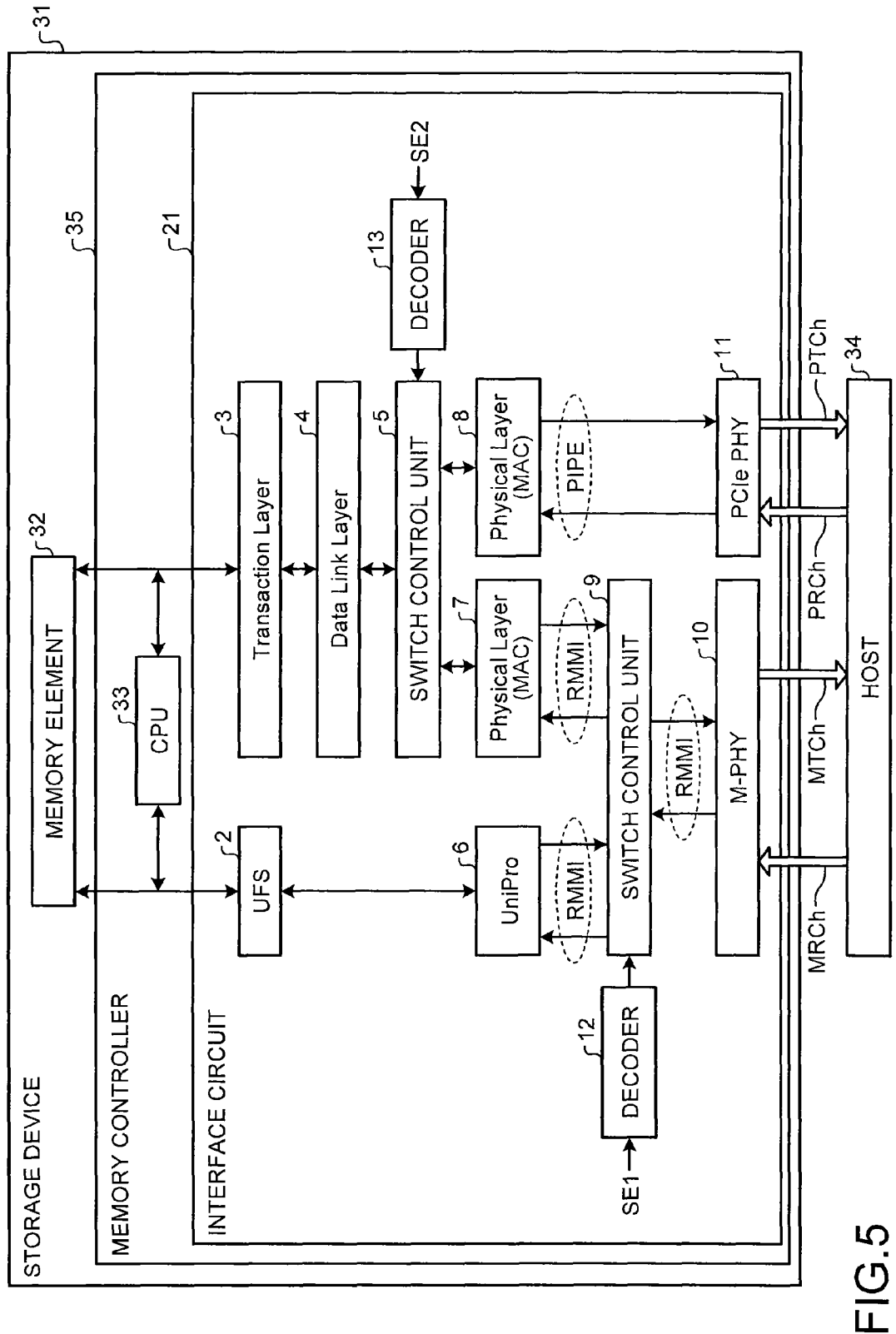
FIG. 5 is a block diagram illustrating a configuration of a storage device to which an interface circuit according to a second embodiment is applied.

FIG. 5 is a block diagram illustrating a configuration of a storage device to which an interface circuit according to a second embodiment is applied.

Referring to FIG. 5, a storage device 31 includes a memory element 32 and a memory controller 35. The memory controller 35 has an interface circuit 21 and a CPU 33 mounted therein. A host 34 is connected to the memory element 32 and the CPU 33 via the interface circuit 21. The host 34 may be a personal computer, a notebook computer, a digital camera, a mobile phone, or a processor that gives instructions to the memory controller 35. The storage device 31 may be an external storage device such as an SSD. The memory element 32 can use an NAND flash memory, and the memory controller 35 can use an NAND controller.

The interface circuit 21 is formed such that decoders 12 and 13 are added to the interface circuit 1 illustrated in FIG. 1. The decoder 12 can instruct the switch control unit 9 to switch the destination for connection of the PHY module 10 according to a selection signal SE1. The decoder 13 can instruct the switch control unit 5 to switch the destination for connection of the data link module 4 according to a selection signal SE2. A reception channel MRCh and a transmission channel MTCh can be provided between the host 34 and the PHY module 10. A reception channel PRCh and a transmission channel PTCh can be provided between the host 34 and the PHY module 11.

For example, if the host 34 is a digital camera, the PHY module 10 is connected to the UniPro module 6 via the switch control unit 9 to allow the interface circuit 21 to conform to the UFS standard. In addition, if the host 34 is a notebook computer, the PHY module 10 is connected to the MAC module 7 via the switch control unit 9 and the MAC module 7 is connected to the data link module 4 via the switch control unit 5 to allow the interface circuit 21 to conform to the M-PCIe standard. Further, if the host 34 is a notebook computer, the MAC module 8 is connected to the data link module 4 via the switch control unit 5 to allow the interface circuit 21 to conform to the PCIe standard. This allows the storage device 31 to realize data communications with the host 34 in conformity with a different standard without having to replace the interface circuit 21.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An interface circuit comprising:
   a first module that executes protocol control in compliance with a first interface standard;
   a second module that is provided separately from the first module and executes protocol control in compliance with a second interface standard; and
   a third module that is provided for a physical layer shared between the first interface standard and the second interface standard, wherein the first module includes a first MAC (Media Access Layer) in conformity with an RMMI (Reference M-PHY Module Interface).

2. The interface circuit according to claim 1, wherein the first interface standard is a UFS (Universal Flash Storage) standard, and the second interface standard is an M-PCIe (Mobile-Peripheral Component Interconnect Express) standard.

3. The interface circuit according to claim 1, comprising a switch control unit that switches a destination for connection of the third module to the first module or the second module.

4. The interface circuit according to claim 1, wherein the first module conforms to UniPro (Unified Protocol).

5. The interface circuit according to claim 1, wherein the second module is provided for a transaction layer and a data link layer, and wherein the third module is provided for an M-PHY (Mobile-Physical Layer).

6. The interface circuit according to claim 1 further comprising:
   a first pin that is intrinsic to the first interface standard; and
   a second pin that is intrinsic to the second interface standard.

7. The interface circuit according to claim 6, wherein the first interface standard is an M-PCIe (Mobile-Peripheral Component Interconnect Express) standard, and the second interface standard is a PCIe (Peripheral Component Interconnect Express) standard.

8. The interface circuit according to claim 7, wherein the second module includes a second MAC in conformity with a PIPE (Physical Interface for PCI Express).

9. The interface circuit according to claim 6, comprising a switch control unit that switches a destination for connection of the third module to the first module or the second module.

10. The interface circuit according to claim 6, wherein the second module is provided for a transaction layer and a data link layer, and wherein the third module is provided for an M-PHY (Mobile-Physical Layer).

11. An interface circuit comprising:
    a first module that executes protocol control in compliance with a first interface standard;
    a second module that is provided separately from the first module and executes protocol control shared between a second interface standard and a third interface standard;
    a third module that is provided for a physical layer shared between the first interface standard and the second interface standard; and
    a fourth module that is provided separately from the third module and is provided for a physical layer in compliance with the third interface standard.

12. The interface circuit according to claim 11, wherein the first interface standard is a UFS (Universal Flash Storage) standard, the second interface standard is an M-PCIe (Mobile-Peripheral Component Interconnect Express) standard, and the third interface standard is a PCIe (Peripheral Component Interconnect Express) standard.

13. The interface circuit according to claim 11, comprising:
    a first switch control unit that switches a destination for connection of the third module to the first module or the second module; and
    a second switch control unit that switches a destination for connection of the second module to the third module or the fourth module.

14. The interface circuit according to claim 11, wherein the first module conforms to UniPro.

15. The interface circuit according to claim 11, wherein the second module is provided for a transaction layer and a data link layer.

16. The interface circuit according to claim 11, wherein the third module is provided for an M-PHY, and wherein the fourth module is provided for a PCIe PHY.

17. The interface circuit according to claim 11 further comprising:
    a first pin that is intrinsic to the first interface standard; and
    a second pin that is intrinsic to the second interface standard; and
    a third pin that is intrinsic to the third interface standard.

* * * * *